Patented June 23, 1936

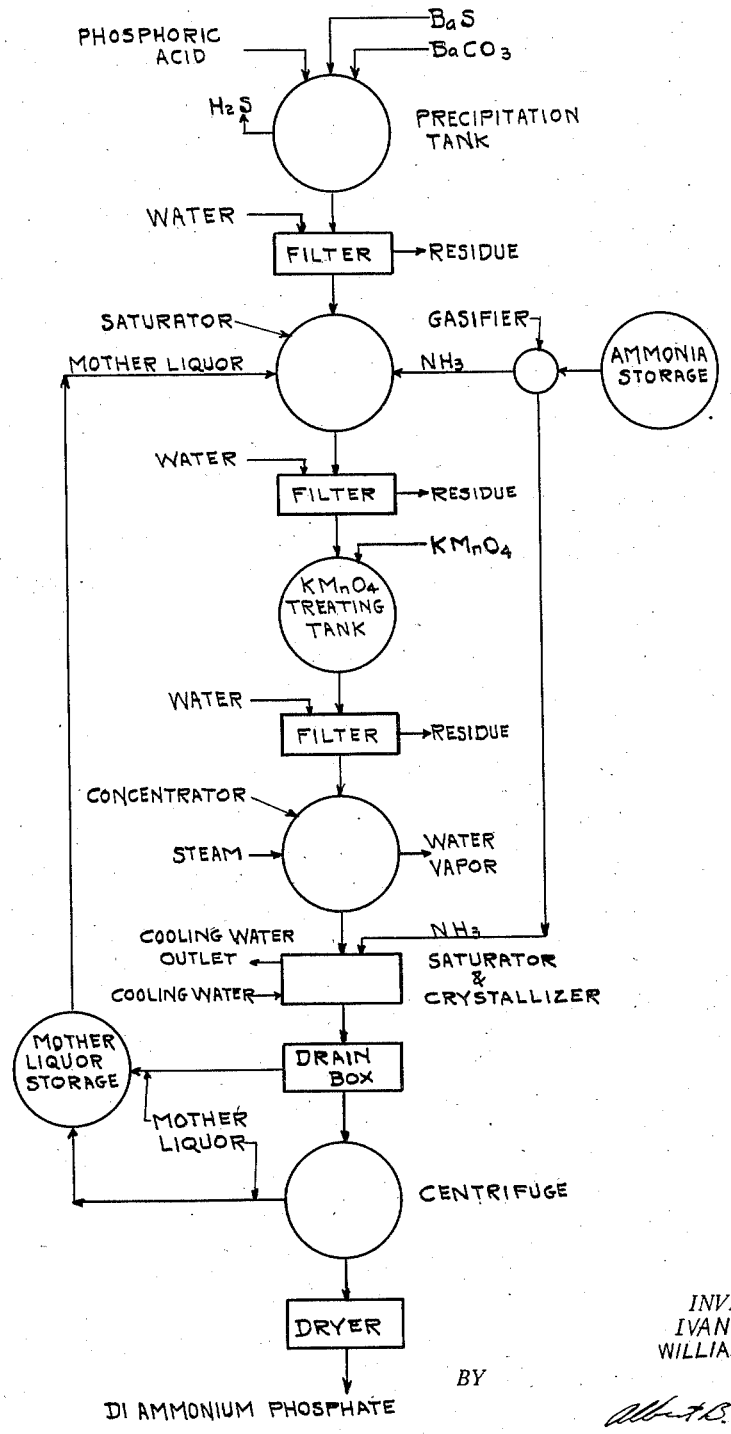

2,044,940

UNITED STATES PATENT OFFICE 2,044,940

PREPARATION OF A SOLUBLE PHOSPHATE

Ivan Lyle Haag, Lakewood, and William Richard Devor, East Cleveland, Ohio, assignors to The Grasselli Chemical Company, Cleveland, Ohio, a corporation of Delaware Application November 25, 1933, Serial No. 699,746

14 Claims. (Cl. 23—107)

The present invention relates to a process of manufacturing ammonium phosphate of food grade. We start with a technical phosphoric acid solution, and by the processes of our invention, convert this impure commercial acid to ammonium phosphates substantially free from impurities which would render them unfit for use in food products.

Among the impurities present in commercial phosphoric acid are arsenic, sulfates, silicofluorides, iron, aluminum, manganese, and organic material. These may not be present in the finished ammonium phosphate if it is to be used in a food product. The arsenic is particularly objectionable.

In the production of ammonium phosphates we crystallize the purified product from a solution which has previously been treated to remove impurities, leaving a mother liquor which contains a rather large amount of ammonium phosphates. Economy requires that this ammonium-phosphate-containing mother liquor be returned to the system. In treating the phosphoric acid it is necessary to guard against the use of treating agents which will introduce soluble compounds into the system, for, by reason of our continuous recirculation of the mother liquor, such soluble compounds will build up and eventually crystallize out with the product. For example, if silicofluoride be precipitated as $Na_2SiF_6$ by the addition of soda ash, not only is it difficult to effect a satisfactory removal of silicofluoride, but the soluble sodium salts which are left in the system are very difficult to remove. If these sodium salts be permitted to build up in the liquors, ammonium phosphate crystals too high in this impurity will be produced. Again, if manganese were removed by oxidizing with such agents as chlorine or chlorates, chlorides would build up in the system and a product too high in chlorides would be obtained.

It is an object of our invention to operate in such a manner and to use such treating agents that the building up of soluble salts in the system will be avoided. Another object of our invention is to provide economical and efficient processes for removing impurities.

In the removal of arsenic, sulfate, and silicofluoride we have found barium sulfide particularly suitable. Barium sulfide furnishes both barium, to precipitate sulfate and silicofluoride, and sulfur, to precipitate arsenic. Thus both the anion, sulfur, and the cation, barium, are used in our process for precipitating impurities. This results in a marked economy of operation, permits easier and more accurate control, and aids in producing a purer product. Barium sulfide does not form soluble salts which, if present in excess, would build up in the system, but its salts, on the contrary, are removed with great ease.

In carrying out our process we treat a phosphoric acid solution with barium sulfide, preferably at room temperature. The solution is separated from the precipitated impurities and then subjected to a partial ammoniation.

The partial ammoniation causes the precipitation of iron and aluminum as phosphates, and causes the precipitation of any arsenic and silicofluoride not previously removed. In strong phosphoric acid solution the precipitation of arsenic as sulfide, and silicofluoride as barium compounds may not be complete. On partial ammoniation the acidity of the solution is reduced, and the arsenic and silicofluoride may precipitate as sulfide and barium compounds respectively. Also, some silico fluoride, probably due to its combination with other impurities present, precipitates at this point. Some arsenic may also be precipitated at this point as compounds other than sulfides. The amount is, however, not large.

Since on partial ammoniation a certain amount of silicofluoride precipitates without the addition of barium compounds, it is not necessary to provide enough barium in the first precipitation step to react with all of the silicofluoride present. Enough barium should be provided to react with all of the sulfate present, and to react with the silicofluoride which would not precipitate without the addition of barium. We have empirically found that generally enough barium should be present to precipitate the sulfate, figuring 100% efficiency, plus enough to precipitate about three-fourths of the silicofluoride, figuring 100% efficiency. We may, however, add enough barium at this point to entirely remove the silicofluoride as barium compounds.

The barium and sulfur of barium sulfide are, of course, always present in a fixed relation, but there is no such fixed relation between the amounts of arsenic and sulfate silicofluoride. There are three possible relationships which may exist between the amount of arsenic which is to be precipitated as sulfide and the amount of sulfate plus silicofluoride which is to be precipitated as barium compounds. The amount of arsenic present may be such that the amount of sulfide required to precipitate it, is A equal to, B less than, C greater than, the equivalent amount of barium required to precipitate the sulfate plus silicofluoride.

In each of these three cases the amount of barium sulfide to be added may be based on the arsenic or on the sulfate plus silicofluoride.

In case A, the cation and anion of the barium sulfide are each entirely utilized. It is immaterial whether the barium sulfide be based on the arsenic or on the sulfate plus silicofluoride since the result is the same in either event.

In case B, which is the one most often encountered, if the barium sulfide is based on arsenic, there will be a deficiency of barium to precipitate the sulfate and silicofluoride. We may add a barium compound which will not introduce soluble salts into the system in order to make up the deficiency in barium. That is, we add the quantity of barium sulfide required to precipitate the arsenic as sulfide, and then add enough barium carbonate, barium phosphate, or barium hydroxide to bring the total barium to that required to precipitate the sulfate, plus that required to precipitate the silicofluoride.

If, in case B, the barium sulfide addition is based on the sulfate plus silicofluoride, there will be an excess of sulfide over that needed to precipitate the arsenic. This excess of sulfide would not, however, contaminate the finished product, as it would escape as hydrogen sulfide gas.

In case C, if the barium sulfide is based on the arsenic, there will be an excess of barium. The excess barium would not build up in the mother liquor and contaminate the phosphate crystals, as it would precipitate after the partial ammoniation as barium phosphate and would be removed from the system at that point. If desired, the excess barium may be easily removed by adding ammonium sulfate. This addition precipitates the barium as a sulfate and does not introduce soluble salts which would build up in the system and contaminate the product.

If, in case C, the barium sulfide addition were based on the sulfate plus silicofluoride, there would not be enough sulfide present to remove all of the arsenic. Extra sulfide could be supplied as by the use of hydrogen sulfide gas or ammonium sulfide. Or, if desired, the proper ratio of barium to sulfur may be obtained by using mixtures of barium sulfide and barium sulfhydrate.

While economy dictates that no great excess of barium sulfide over the amount necessary be used, the addition of barium sulfide in excess would have no effect on the purity of our product. If an amount of barium sulfide in excess of that needed to precipitate the arsenic, sulfate and silicofluoride were added, the barium would precipitate as phosphate after the partial ammoniation. The excess sulfur would leave the system as hydrogen sulfide during the course of the process.

Having precipitated the arsenic, sulfate, and silicofluoride by the treatment with barium sulfide, we separate the precipitate from the acid solution. It is preferred to remove this precipitate before the partial ammoniation, as the ammoniation may cause a partial redissolution of the silicofluoride and arsenic. The addition of the ammonium-phosphate-containing mother liquor may have a similar effect; so the precipitate should be removed prior to adding the mother liquor.

While our processes of removing arsenic, sulfate, and silicofluoride are well adapted to be used in the cyclic process of manufacture herein described, and cooperate with the other steps herein set forth, they may, however, be used separate and apart from the cyclic process, either alone or with other processes of producing phosphates or purified phosphoric acid.

After removing the arsenic, sulfate, and silicofluoride, as by filtration, we add mother liquor to the partly purified phosphoric acid.

The mixture of phosphoric acid and mother liquor is treated with anhydrous ammonia. If we desire to make mono-ammonium phosphate as an end product, the ammoniation proceeds only to the mono-ammonium stage. If we desire diammonium phosphate as a product, we continue the ammoniation to about ⅛ of the way past the mono stage. The temperature rises to about 80° C. due to the heat of the reaction. We preferably keep the temperature below boiling to prevent undue concentration of the solution. Instead of using anhydrous ammonia for this first ammoniation, we may use an ammonia solution.

The phosphate solution is then filtered to remove the residue which forms. This residue is largely iron and aluminum phosphates and, as noted above, contains any arsenic and silicofluoride not previously removed.

Having removed arsenic, silicofluoride, sulfate, iron, and aluminum, and having the phosphoric acid ammoniated to mono, or slightly beyond mono, phosphates, we now proceed to remove manganese and to destroy organic matter. We accomplish the precipitation of manganese and destroy organic matter by boiling the phosphate solution with permanganates, such as potassium, sodium, ammonium, barium, calcium, etc., permanganates. The permanganates are used in very small quantities as the amount of manganese and organic matter is very small.

None of the permanganates introduce soluble salts which would build up in the system. Potassium and sodium permanganates, for instance, are continuously removed with the ammonium phosphate product. They probably form double salts of the type, potassium ammonium phosphate. The amount of permanganate used in our process is so small that no more than a trace of potassium or sodium appears in the product. When ammonium permanganate is used, the slight amount of extra ammonium introduced into the system is of no consequence.

When barium, calcium, etc. permanganates are used, the barium, calcium, etc. are immediately removed from the system, as they react to form insoluble phosphate. The amount of phosphate lost in this way is very small.

It is seen that the use of ammonium, barium, calcium, etc. permanganates introduces no impurities into the product. And, the use of potassium or sodium permanganates introduces only a trace of impurities into the product.

It is important in our process that the permanganate treatment take place after the removal of arsenic, sulfate, silicofluoride, iron, and aluminum, as otherwise the permanganate would oxidize some of these impurities, for example, ferrous to ferric, iron, thus requiring the addition of large amounts of permanganate. The use of such large additions of permanganates would be very undesirable. With sodium or potassium permanganates, the use of large amounts would result in too impure a product. With barium, calcium, etc. permanganates, the use of large amounts would result in correspondingly large losses of phosphates.

The permanganate treatment should follow the partial ammoniation, as a satisfactory removal of organic matter cannot be effected when strongly acid solutions are treated.

The permanganate treatment should precede a further ammoniation. If the permanganate treatment were made after further ammoniation, to the di-stage as in our manufacture of diammonium phosphate, for example, the boiling of the solution would result in some ammonia being driven off.

While the permanganate treatment co-operates with my cyclic process and finds a very desirable application at the particular point of the process indicated, it may well be used alone or with other processes.

The phosphate solution is filtered, the precipitate preferably washed, and the filtrate and washings concentrated.

The concentrated mono-phosphate liquor is then crystallized if we are making mono-phosphate. The crystals may be centrifuged and dried and the mother liquor returned to the partially purified phosphoric acid, as above noted.

In making diammonium phosphate we treat the concentrated solution of phosphates, which has already been ammoniated a little beyond the mono stage, to a second ammoniation which proceeds to the diammonium stage. This ammoniation proceeds, for example, in a receptacle provided with agitating means, and with cooling and/or heating means with which the temperature may be regulated, preferably at around 97° C. or lower.

The diammonium phosphate crystals may then be separated from the mother liquor and the mother liquor recycled.

For purposes of illustration we will give as an example a process of making diammonium phosphate which embodies our invention. Reference may also be had to the accompanying flow sheet which illustrates this specific example.

We used 107 parts by weight of a 33.6° Bé. solution of phosphoric acid made by treating inorganic phosphates with sulfuric acid, which showed the following analysis:

| | Per cent by weight |
|---|---|
| $H_3PO_4$ | 36.89 |
| Fluorine (F) | 1.45 |
| Sulfates ($SO_4$) | 1.04 |
| Manganese (Mn) | 0.0077 |
| $AlPO_4 + FePO_4$ | 3.81 |
| Arsenic (As) | 0.001 |

To this phosphoric acid solution we added one part by weight of black ash (75% BaS) and agitated for ½ hour at room temperature. The hydrogen sulfide generated was withdrawn through a ventilator to prevent injury to the workmen. The generation of a small amount of hydrogen sulfide results, because the barium sulfide-arsenic reaction is not quite 100% efficient. The removal of hydrogen sulfide may be aided by blowing air through the solution at some point in the process. We then added four parts by weight of precipitated barium carbonate (97.5% $BaCO_3$) and agitated for about one hour at room temperaure.

The solution was then filtered to remove the $As_2S_3$, $BaSiF_6$, and $BaSO_4$ precipitates and the filter cake washed. The filter cake amounted to 13¼ parts by weight while wet and 7.1 parts by weight when dry. We then added 49.63 parts by weight of mother liquor to the phosphoric acid solution. This mother liquor contained approximately 21.4 parts by weight $(NH_4)_2HPO_4$ and 28.23 parts by weight of water.

Approximately 7.1 parts by weight of $NH_3$ gas were then run in, using pH=5.1 as an end point. This amount of ammonia ammoniates to about ⅛ of the way from the mono to the di stage. The temperature rose to 75° C.

The residue was then filtered off and washed. The filter cake amounted to 21 parts by weight wet and 6.7 parts by weight dry.

We then treated the phosphate liquor with 0.0077 parts by weight $KMnO_4$ crystal, boiled, filtered, and concentrated to 38° Bé. (97 parts by weight). To 89 parts by weight of this phosphate solution were added under pressure 5.5 parts by weight of ammonia gas in a closed receptacle.

The mix was cooled to 24° C. and after draining, the crystals were separated from mother liquor on a centrifuge. There were 31.4 parts by weight of dry crystal and 48 parts by weight of 30° Bé. mother liquor.

We claim:

1. In a process of manufacturing ammonium phosphates from technical phosphoric acid, the steps comprising: treating the phosphoric acid with barium sulfide, separating the solution from the precipitate, adding mother liquor from a previous treatment, ammoniating the mixture, separating the solution from the precipitate, treating the filtrate with a permanganate, separating the solution from the precipitate, crystallizing ammonium phosphate out of the filtrate, and returning the mother liquor from which the crystals have been removed to the ammoniation step.

2. In a process of manufacturing ammonium phosphates from technical phosphoric acid, the steps comprising: adding to the acid barium sulfide and a barium compound which will not introduce soluble salts into the system, separating the solution from precipitated impurities, adding mother liquor from a previous treatment, ammoniating no more than one-eighth of the way from the mono-stage to the di-stage, filtering the phosphate solution from precipitated impurities, treating the phosphate solution with a permanganate, separating the solution from precipitated impurities, crystallizing ammonium phosphate out of the phosphate solution, and returning the mother liquor from which the crystals have been removed to the partly purified phosphoric acid.

3. In a process of making diammonium phosphate from technical phosphoric acid, the steps comprising: adding barium sulfide and a barium compound of the group comprising barium carbonate, barium phosphate, and barium hydroxide to the acid, filtering the solution from precipitated impurities, adding mother liquor from a previous treatment, ammoniating to about one-eighth of the way from the mono to the di-stage, filtering the phosphate solution from precipitated impurities, treating the phosphate solution with a permanganate at boiling temperature, filtering the solution from precipitated impurities, concentrating the phosphate solution, ammoniating to the diammonium stage, crystallizing the diammonium phosphate from the solution, and returning the mother liquor from which the crystals have been removed to the partly purified phosphoric acid.

4. In a process of treating technical phosphoric acid, the steps comprising: adding barium sulfide thereto in about the quantity required to precipitate all of the arsenic, adding barium carbonate thereto to bring the total barium to the amount required to precipitate the sulfate and about three-fourths of the silicofluoride, and separating the phosphoric acid from the precipitated impurities.

5. In a process of treating technical phosphoric acid, the steps comprising: treating the phosphoric acid with barium sulfide in about the amount required to remove all of the arsenic as sulfide, adding a barium compound which will not introduce soluble salts into the system, separating the solution from the resultant precipitate, ammoniating, and separating the phosphate solution from the precipitate, the addition of a barium compound being that necessary to bring the total available barium to about the amount required to precipitate the sulfate and the silicofluoride which will not precipitate without the addition of barium.

6. In a process of treating technical phosphoric acid, the steps comprising: adding barium sulfide to the acid solution to precipitate arsenic, adding a barium compound of the group comprising barium carbonate, barium phosphate, and barium hydroxide in quantity sufficient together with the barium already added to react with all of the sulfate and with about three-fourths of the silicofluoride originally present as impurities in the acid, and separating the precipitated impurities from the phosphoric acid solution, ammoniating the phosphoric acid solution to no more than about one-eighth of the way from mono to di-stage, and separating the phosphate solution from the precipitated impurities.

7. In a process of making phosphates, the steps comprising: treating an impure phosphoric acid with barium sulfide, separating the phosphoric acid from the resultant precipitate, partially ammoniating, separating the resultant phosphate solution from the precipitate, and treating the phosphate solution with a permanganate.

8. In a cyclic process of making phosphates, the steps comprising: treating a technical phosphoric acid to remove arsenic, sulfate, and silicofluoride therefrom, adding mother liquor from a previous treatment, ammoniating, separating the phosphate solution from precipitated impurities, treating the solution with a permanganate, and separating the solution from precipitated impurities.

9. In a process of manufacturing ammonium phosphates from technical phosphoric acid, the steps comprising: adding to the acid barium sulfide and a soluble barium compound, separating the solution from precipitated impurities, adding mother liquor from a previous treatment, ammoniating no more than one-eighth of the way from the mono-stage to the di-stage, filtering the phosphate solution from precipitated impurities, treating the phosphate solution with a permanganate, separating the solution from precipitated impurities, crystallizing ammonium phosphate out of the phosphate solution, and returning the mother liquor from which the crystals have been removed to the partly purified phosphoric acid.

10. In a process of treating technical phosphoric acid, the steps comprising: treating the phosphoric acid with barium sulfide in about the amount required to remove all of the arsenic as sulfide, adding a barium compound which will not introduce soluble salts into the system, separating the solution from the resultant precipitate, ammoniating, and separating the phosphate solution from the precipitate, the addition of a barium compound being that necessary to bring the total available barium to about the amount required to precipitate the sulfate and the silicofluoride which will not precipitate without the addition of barium.

11. In a process for removing manganese and organic matter from an ammonium phosphate solution containing at least one of the same, the said solution being not substantially more acidic than monoammonium phosphate, the step comprising adding thereto an alkali metal permanganate.

12. In a process for removing manganese and organic matter from an ammonium phosphate solution containing at least one of the same, the said solution being not substantially more acidic than monoammonium phosphate, the step comprising adding thereto a permanganate of the group consisting of ammonium, barium, and calcium permanganates.

13. In a process for removing manganese and organic matter from an ammonium phosphate solution containing at least one of the same, the said solution being substantially free from arsenic, sulfate, silicofluoride, iron and aluminum, and being ammoniated to at least the mono-stage, the step comprising treating the solution with a permanganate to precipitate manganese and to destroy organic matter.

14. In a process for removing manganese and organic matter from an ammonium phosphate solution containing at least one of the same, the said solution being substantially free from arsenic, sulfate, silicofluoride, iron, and aluminum, and being ammoniated to at least the mono stage, the steps comprising adding a permanganate, boiling, and separating the phosphate solution from precipitated impurities.

IVAN LYLE HAAG.
WILLIAM RICHARD DEVOR.